(12) United States Patent
Archambault et al.

(10) Patent No.: US 11,999,577 B2
(45) Date of Patent: Jun. 4, 2024

(54) METHODS AND SYSTEMS FOR MANAGING AIRFLOW IN CONDUITS AND PNEUMATIC TUBES

(71) Applicants: George Archambault, Lakewood, CO (US); Greg Arbour, Denver, CO (US); Mike Boyd, Denver, CO (US)

(72) Inventors: George Archambault, Lakewood, CO (US); Greg Arbour, Denver, CO (US); Mike Boyd, Denver, CO (US)

(*) Notice: Subject to any disclaimer, the term of this patent is extended or adjusted under 35 U.S.C. 154(b) by 803 days.

(21) Appl. No.: 16/951,917

(22) Filed: Nov. 18, 2020

(65) Prior Publication Data

US 2021/0147163 A1    May 20, 2021

Related U.S. Application Data

(60) Provisional application No. 62/936,995, filed on Nov. 18, 2019.

(51) Int. Cl.
*B65G 53/66* (2006.01)
*B65G 53/52* (2006.01)

(52) U.S. Cl.
CPC ............. *B65G 53/66* (2013.01); *B65G 53/52* (2013.01)

(58) Field of Classification Search
CPC ................................ B65G 53/66; B65G 53/52
See application file for complete search history.

(56) References Cited

U.S. PATENT DOCUMENTS

| 2,572,862 A | 10/1951 | Israel |
| 3,490,813 A | 1/1970 | Hallstrom |
| 3,651,912 A | 3/1972 | Rohner |
| 3,689,010 A | 9/1972 | Alexandrov et al. |
| 3,788,338 A | 1/1974 | Burns |
| 3,853,355 A | 12/1974 | Buisson |
| 3,938,848 A | 2/1976 | Krambrock et al. |
| 3,951,461 A | 4/1976 | De Feudis |
| 3,953,078 A | 4/1976 | Aitken |
| 4,013,551 A | 3/1977 | de Feudis |
| 4,076,321 A | 2/1978 | Haight et al. |
| 4,079,548 A | 3/1978 | Zaccaria |
| 4,099,457 A | 7/1978 | Hyden |
| 4,108,498 A | 8/1978 | Bentsen |
| 4,111,315 A | 9/1978 | Hungerbach |

(Continued)

FOREIGN PATENT DOCUMENTS

| CN | 1361744 | 7/2002 |
| DE | 2340896 | 3/1974 |

(Continued)

OTHER PUBLICATIONS

U.S. Appl. No. 17/118,360, filed Dec. 10, 2020.

(Continued)

*Primary Examiner* — William R Harp

(74) *Attorney, Agent, or Firm* — Sheridan Ross P.C.

(57) ABSTRACT

Methods and system for managing airflow across pipe or tube connections are provided. In some embodiments, methods and systems are provided that are well suited for use in pneumatic tube delivery systems having connections between tubes of different diameter. Airflow sources and management devices are provided to accommodate pressure changes and energy changes associated with pipe or tube expansions and contractions.

18 Claims, 6 Drawing Sheets

(56) References Cited

U.S. PATENT DOCUMENTS

| | | | |
|---|---|---|---|
| 4,155,851 A | 5/1979 | Michael | |
| 4,491,442 A * | 1/1985 | Stelter | B65G 53/58 |
| | | | 406/195 |
| 4,592,679 A | 6/1986 | Boiting et al. | |
| 4,827,415 A | 5/1989 | Gudat et al. | |
| 4,909,676 A * | 3/1990 | Heep | B65G 53/521 |
| | | | 406/14 |
| 4,995,765 A | 2/1991 | Tokuhiro et al. | |
| 5,009,551 A | 4/1991 | Swartz | |
| 5,042,521 A | 8/1991 | Shiommi | |
| 5,215,412 A | 6/1993 | Rogoff et al. | |
| 5,882,149 A | 3/1999 | DeWitt et al. | |
| 5,954,078 A | 9/1999 | Chiang et al. | |
| 6,287,056 B1 | 9/2001 | Szikszay | |
| 6,322,295 B1 | 11/2001 | Gabriele | |
| 6,477,442 B1 | 11/2002 | Valerino, Sr. | |
| 6,565,284 B2 | 5/2003 | Gearhart | |
| 6,712,561 B1 | 3/2004 | Valerino, Sr. et al. | |
| 6,786,681 B2 | 9/2004 | Grasshoff | |
| 7,326,005 B1 | 2/2008 | Castro et al. | |
| 7,886,402 B2 | 2/2011 | Kihlstrom | |
| 8,147,169 B1 | 4/2012 | Kvalheim | |
| 8,360,691 B2 | 1/2013 | Moretto | |
| 8,560,116 B2 | 10/2013 | Ojdemark | |
| 8,596,932 B2 | 12/2013 | Hoganson et al. | |
| 9,073,706 B2 | 7/2015 | Arrabal et al. | |
| 9,302,849 B2 | 4/2016 | Forestier et al. | |
| 9,405,992 B2 | 8/2016 | Badholm et al. | |
| 9,540,187 B2 | 1/2017 | Valerino, Sr. | |
| 9,549,784 B1 | 1/2017 | Valerino, Sr. | |
| 9,725,253 B2 | 8/2017 | Embley | |
| 9,738,442 B2 | 8/2017 | Pedersen | |
| 10,843,879 B2 | 11/2020 | Archambault | |
| 11,059,681 B2 | 7/2021 | Lathan | |
| 11,078,711 B1 | 8/2021 | Garrone, Jr. et al. | |
| 2004/0025938 A1 | 2/2004 | Berry | |
| 2005/0236042 A1 | 10/2005 | Hansen | |
| 2010/0127090 A1 | 5/2010 | Tomblom et al. | |
| 2010/0218336 A1 | 9/2010 | Kihlstrom | |
| 2010/0307537 A1 | 12/2010 | Sundholm | |
| 2012/0321395 A1 | 12/2012 | Alfrost et al. | |
| 2013/0089380 A1 | 4/2013 | Arrabal et al. | |
| 2013/0243536 A9 | 9/2013 | Arrabal et al. | |
| 2015/0246773 A1 | 9/2015 | Sundholm | |
| 2016/0097206 A1 | 4/2016 | Embley | |
| 2016/0167898 A1 | 6/2016 | Sundholm | |
| 2017/0022008 A1 | 1/2017 | Tornblom | |
| 2017/0101275 A1 | 4/2017 | Embley | |
| 2018/0043347 A1 | 2/2018 | Holtz et al. | |
| 2019/0291974 A1 | 9/2019 | Archambault | |
| 2019/0374895 A1 | 12/2019 | Hidalgo Castado et al. | |

FOREIGN PATENT DOCUMENTS

| | | |
|---|---|---|
| EP | 2022731 | 2/2009 |
| WO | WO 01/05683 | 1/2001 |
| WO | WO 01/05684 | 1/2001 |
| WO | WO 2004/094270 | 11/2004 |
| WO | WO 2009/080885 | 7/2009 |
| WO | WO 2016/054508 | 4/2016 |

OTHER PUBLICATIONS

U.S. Appl. No. 17/370,916, filed Jul. 8, 2021.
Official Action for U.S. Appl. No. 17/370,916, dated May 18, 2022, 8 pages.
Official Action for U.S. Appl. No. 17/370,916, dated Oct. 18, 2021, 7 pages. Restriction Requirement.
Official Action for U.S. Appl. No. 17/118,360, dated Sep. 7, 2023, 10 pages.

* cited by examiner

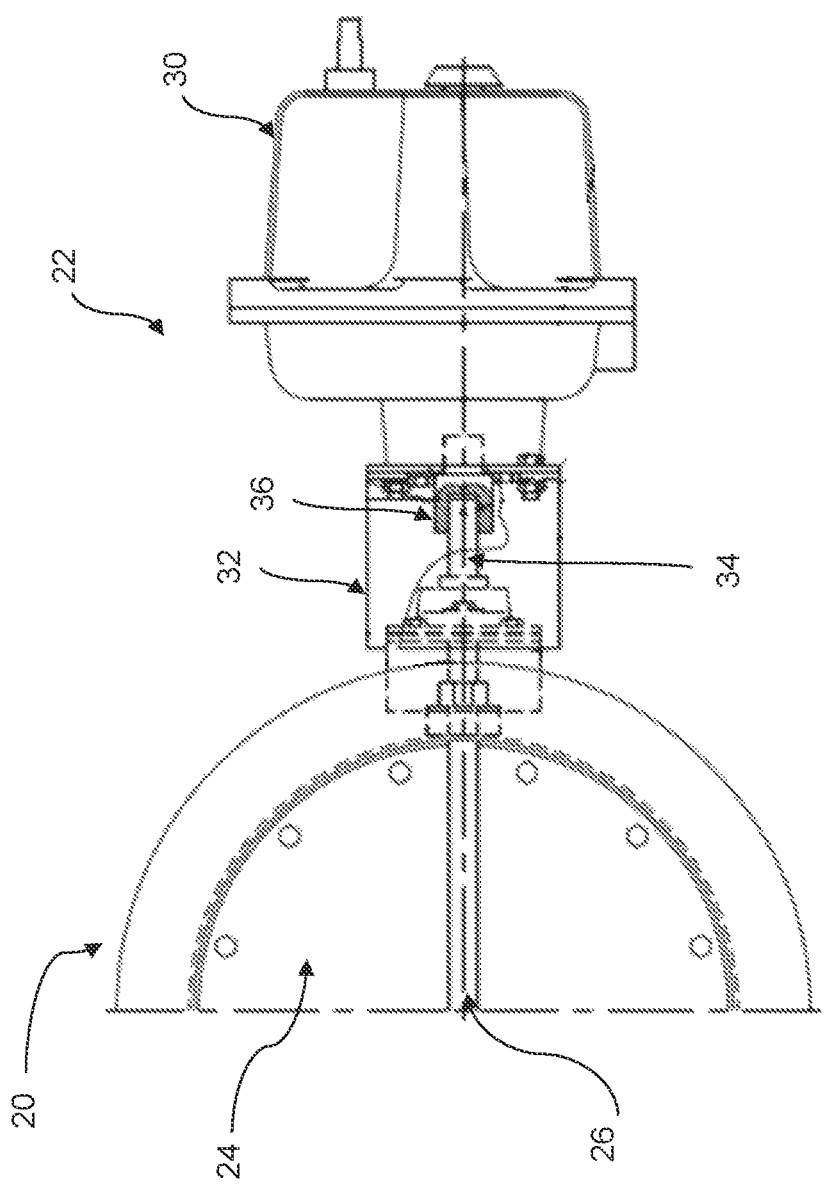

METHODS AND SYSTEMS FOR MANAGING AIRFLOW IN CONDUITS AND PNEUMATIC TUBES

This U.S. Non-Provisional Patent Application claims the benefit of priority from U.S. Provisional Patent Application Ser. No. 62/936,995, filed Nov. 18, 2019, the entire disclosure of which is hereby incorporated by reference.

FIELD

The present disclosure relates generally to interconnecting pipes, conduits and tubing of various diameters. In some embodiments, the present disclosure relates to pneumatic tube delivery and vacuum transport systems. More specifically, certain embodiments of the present disclosure provide pneumatic tube delivery systems with a plurality of tube diameters and wherein airflow and material flow through the system are managed.

BACKGROUND

Pneumatic tube delivery and vacuum transport systems are useful for safely and efficiently transporting materials. Such systems are known to be used for transporting materials such as waste, linens, currency, and other objects from point to point. The systems typically convey materials between different locations in a building, a development, or other interconnected space.

In various systems including, but not limited to pneumatic tube delivery systems ("PTS"), it can be desirable to provide tubes of different diameters interconnected to one another in series. For example, a tube for conveying trash, linen or other materials may comprise a tube having a first diameter that interconnects or transitions to a tube of a different diameter thereby creating an expansion or contraction at the union of the tubes.

However, transitioning pipe diameters poses specific engineering challenges particularly in trash and linen systems. For example, such transitions create complications in controlling the velocity of the material in a smaller pipe (e.g., a 16" diameter transport pipe) while maintaining the desired airflow in the larger pipe (e.g. a 20" diameter pipe) and at the collection equipment.

SUMMARY

Accordingly, there has been a long-felt but unmet need to provide methods and systems for providing and managing pipe and tube transitions within various systems, particularly for systems that are intended to convey materials of varying size and characteristics (e.g. trash and linen).

In various embodiments, the present disclosure provides methods and systems for monitoring various conditions at or proximal to pipe or tube transitions. Monitored conditions include, for example, airflow velocity, air pressure, and potential blocks or clogs in the system. One of skill in the art will recognize that when a pipe, tube or conduit of a first diameter is connected in series to a pipe, tube or conduit of a second, larger, diameter, the interconnection will necessarily comprise an expansion that creates a reduction in pressure. Due to mass conservation, and assuming a constant density of air flowing in the system, volumetric flow rate must be the same above and below an expansion. A mechanical energy loss occurs across a sudden expansion. It will also be recognized that for various systems including but not limited to PTS's, pipes and tubes are calibrated and provided with a specific amount of energy to properly convey materials. An energy loss due to expansion may thus negatively affect a system's ability to fulfill its intended purposes.

In some embodiments, methods and systems of the present disclosure comprise a "make-up" or supplemental air source that is operable to provide a variable volume of air to the system. Supplemental air sources of the present disclosure include, for example, drawing air into a system via conduit or tube supplied with air from an external environment. In some embodiments, the supplemental air source is in communication with and monitored by a differential pressure device and metered by a variable flow inlet damper. The differential pressure device is operable to monitor an airflow in the system and communicates via a controller or control system to the variable flow inlet damper to increase or decrease flow as needed. For example, in some embodiments, it is contemplated that airflow sensors are provided upstream and downstream of a pipe transition. The pipe transition may, for example, comprise a 16" diameter material transport pipe that flows into a larger 20" diameter material transport pipe. However, no limitation with respect to pipe size or percentage of expansion is provided. In some embodiments, an airflow sensor is provided in the smaller upstream pipe, and a second airflow sensor is provided in the larger downstream pipe. If, for example, the airflow in the larger downstream pipe is deemed to be insufficient, methods and systems of the present disclosure contemplate that the controller prompts the supplemental air source to increase flow in at least the larger pipe. In preferred embodiments, this increase in airflow is automatically triggered by the system. It is also contemplated, however, that the system may signal to a user or operator of the system to manually increase a flow of air.

Embodiments of the present disclosure contemplate at least one pressure monitor that is operable to communicate with and control an inlet damper, which is controlled to increase or decrease airflow in at least portions of a system and depending on information received from the pressure monitor. If, for example, airflow in the system is unacceptably high, airflow through the inlet damper is reduced. If the flow is lower than what is required to move material through the pipe, a signal is sent to position the damper to increase the airflow through the inlet damper and thereby increase airflow. In some embodiments, the damper is provided within a make-up air source pipe, which is sized to allow for the amount of makeup air required to move trash and linen through the larger material transport pipe.

In various embodiments, systems of the present disclosure comprise a plurality of dampers. In some embodiments, an upstream damper is provided in addition to the inlet damper in the make-up air source pipe. The upstream damper is operable to be opened to allow proper airflow for the system. In addition, embodiments of the present disclosure contemplate that a primary air mover (e.g. fan) of a PTS is automatically adjusted via the control system. Such control may be particularly advantageous when an upstream damper is not sufficient to supply the appropriate adjusted airflow.

Without limitation, it is contemplated that air pressure monitors are located on a main, larger material transport pipe as well as on the make-up air pipe. In order to move material from a smaller (e.g. 16" diameter) pipe to a larger (e.g. 20" diameter) pipe, supplemental airflow is provided to account for a difference in volume or mass flow between the smaller and larger material transport pipe. This allows more airflow in the larger pipe without having to increase the flow rate in the smaller pipe, which can potentially case damage to the system.

While various embodiments of the present disclosure relate to and are well suited for use in PTS's for conveying trash and linen (for example), it will be recognized that methods and systems provided herein are not limited to such systems. Indeed, it is contemplated that methods, system and devices of the present disclosure are useful in and contemplated as being provided in various systems including, for example, HVAC systems, plumbing systems, automotive applications, and any other systems or devices that require or otherwise provide one or more transitions in pipe diameter. It is known, however, that trash and linen systems provide and handle a flow of material that is not consistent (at least as compared with HVAC systems, for example, that provide a homogeneous flow). The high degree of variability of material flowing through a PTS provides unique challenges and in at least some embodiments of the present disclosure the amount of supplemental or make-up air that is needed is based at least partially on the variability of the flow stream. It is known, for example, that differences in weight and mass of the flow stream (which comprises both air and materials) will create different loads on the system and different pressure and airflow requirements over time. Embodiments of the present disclosure provide for a supplemental air source that is operable to accommodate such differences. In some embodiments, systems of the present disclosure automatically adjust an airflow to at least a portion of a PTS (or other system) based on data received from one or more sensors.

It will be recognized that the present disclosure is not limited to any particular method or device for sensing flow conditions. While some embodiments contemplate a differential pressure monitor, devices that read volumetric flow rates are contemplated in addition to or in lieu of such pressure monitors. In addition, while certain embodiments contemplate a control system that is operable to activate and control an airflow damper, alternative embodiments contemplate a weighted damper in conjunction with a vacuum of the system. If the system needs more air, the weighted damper adjusts automatically to increase the inlet opening size or vice versa.

In one embodiment, a pneumatic tube delivery system is provided. The system comprises a primary air mover for providing air to the system and conveying materials through the system. A first pneumatic tube having a first diameter is provided. A second pneumatic tube is provided having a second diameter, wherein the second diameter is greater than the first diameter. The first pneumatic tube comprises a first airflow sensor and the second pneumatic tube comprises a second airflow sensor, wherein the first airflow sensor and the second airflow sensor are in communication with a controller. The controller is in communication with and operable to control a valve to regulate airflow.

In one embodiment, a method of operating a pneumatic tube delivery system is provided. The method comprises providing a first pneumatic tube having a first diameter and providing a second pneumatic tube having a second diameter, wherein the second diameter is greater than the first diameter. A first airflow sensor is provided in communication with the first pneumatic tube and a second airflow sensor in communication with the second pneumatic tube, wherein the first airflow sensor and the second airflow sensor are in communication with a controller. The controller is in communication with and operable to control a valve to regulate airflow. A value from the first airflow sensor is compared with a value from the second airflow sensor and based on the comparing step, airflow to the second pneumatic tube is selectively increased or decreased.

In various embodiments, it is contemplated that methods and systems of the present disclosure provide a supplemental source, volume and flow of air to a downstream tube that is larger than an interconnected upstream tube. Such methods and systems thereby avoid applying excessive pressure on the smaller, upstream tube and thereby reduce risk of damage to systems.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In addition, the materials, methods, and examples are illustrative only and are not intended to be necessarily limiting.

DESCRIPTION OF THE DRAWINGS

FIG. 5 depicts a damper and a damper actuator according to one embodiment of the present disclosure.

DETAILED DESCRIPTION

Figure 1:
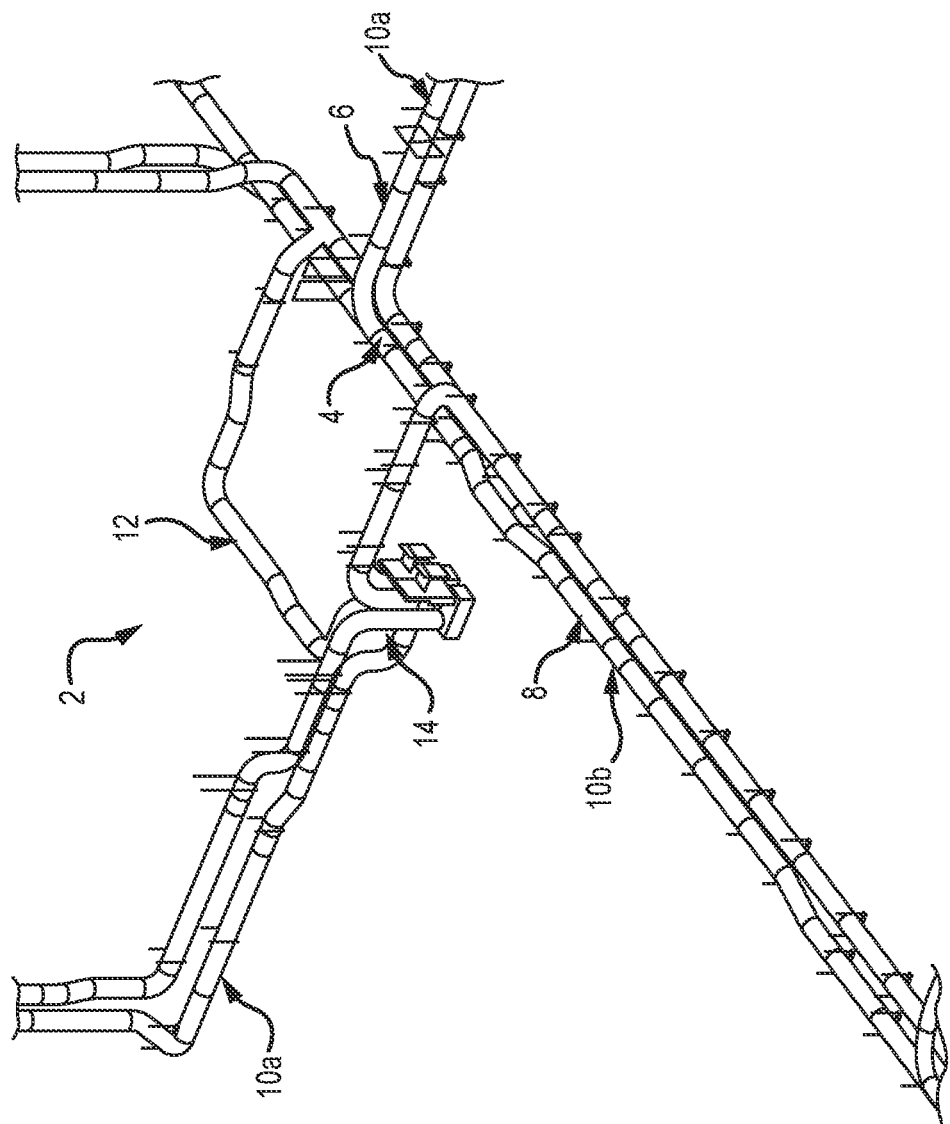
FIG. 1 is a perspective view of a PTS according to one embodiment of the present disclosure.

FIG. 1 is a perspective view of a PTS 2 according to one embodiment of the present disclosure. The PTS 2 of FIG. 1 is contemplated as being a system that conveys trash or linen. The PTS 2 of FIG. 1 comprises a plurality of tubes or transport pipes. The system comprises at least one transition 4 wherein a first tube 6 having a first diameter (e.g. 16") is connected to and flows into a second tube 8 of a second diameter and wherein the second diameter is larger than the first (e.g. 20"). The system further comprises a plurality of airflow monitors 10a, 10b, and wherein a first airflow monitor 10a is provided upstream of the at least one transition 4 and a second airflow monitor 10b is provided downstream of the at least one transition. The monitors are in communication with a controller (not shown in FIG. 1) and the controller is in communication with a supplemental air source to electively increase or decrease airflow from the supplemental airflow source 12. The system of FIG. 1 preferably comprises a primary air mover (e.g. fan or vacuum) in addition to the supplemental air source. A damper 14 is provided in a transport pipe to selectively open an allow supplemental air to provided to a pipe (for example, to the second pipe 8 when the pressure in the second pipe 8 is too low).

Although the system of FIG. 1 depicts pipes as either 16-inch or 20-inch diameter pipes, it will be recognized that the present disclosure is not limited to any particular pipe or tube size.

Figure 4:
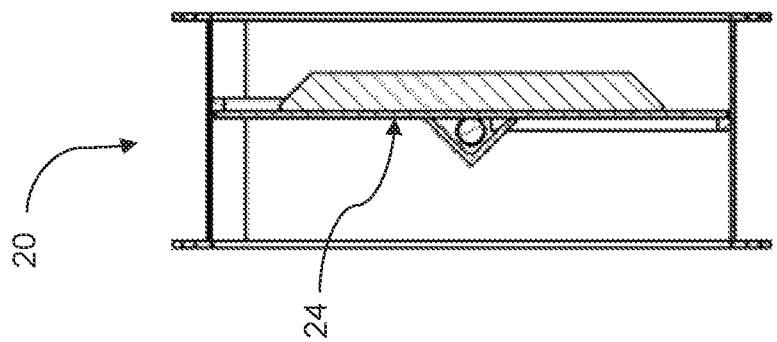
FIG. 4 is a cross-sectional elevation view of a damper according to one embodiment of the present disclosure.
Figure 3:
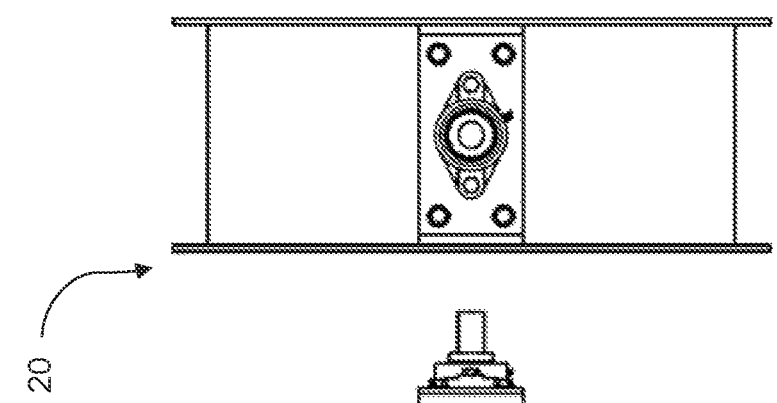
FIG. 3 is a side elevation view of a damper according to one embodiment of the present disclosure.
Figure 2:
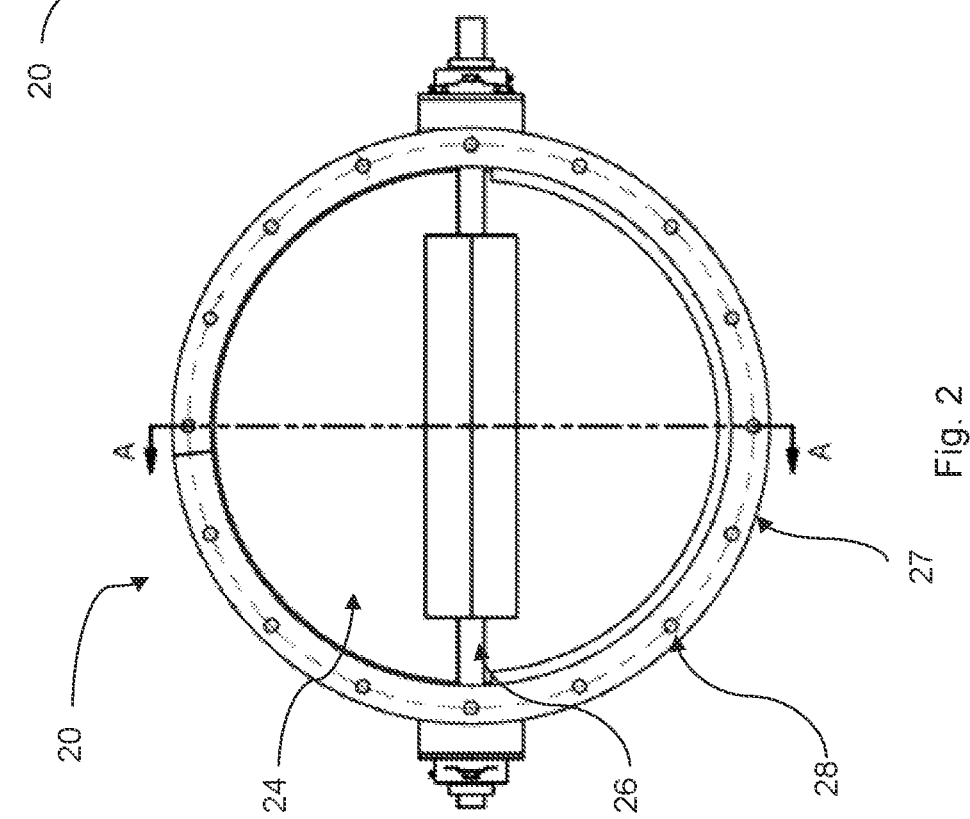
FIG. 2 is front elevation view of a damper according to one embodiment of the present disclosure.

FIGS. 2-4 are front, side and cross-sectional views of a damper 20 contemplated for use with various embodiments of the present disclosure. One or more dampers 20 as shown in FIGS. 2-4 are contemplated as being provided in various locations within systems of the present disclosure. For example, the damper 20 can be provided within a supplemental air source tube, and/or may be provided upstream of a pipe transition to control airflow. The damper 20 comprises a plate 24 and a central axle 26 that are rotatable to open and close the damper. The plate 24 is operable to selectively restrict airflow by being rotated about the central axle. As will be recognized, the plate 24 is operable to be provided in a first position that blocks substantially all air flow and a second position wherein the plate has been rotated approximately ninety degrees such that only a thickness of the plate 24 is provided in a flow path and airflow is substantially unrestricted.

As shown in FIG. 2, the damper 20 comprises a flange 27 with a plurality of apertures 28 for securing the damper 20 in a system. The damper 20 may be provided at a union or two pipes and/or in an air make-up pipe that selectively provides air and fluid flow to an additional pipe.

FIG. 5 shows a damper 20 and an actuator assembly 22 contemplated for use with various embodiments of the present disclosure. The actuator assembly 22 preferably comprises an electric motor 30 that is operable to receive signals from a system and adjust an actuator 32 connected to the damper 20 accordingly. For example, when systems of the present disclosure comprising airflow sensors change in airflow in a portion of the system that is in excess of an allowable amount, a controller of the system is operable to send a signal to the actuator assembly 22 to provide power to the motor 30 and close or open the damper 20 by transmitting power to the axle 26 of the damper 20 via the actuator 32.

As shown in FIG. 5, the actuator 32 comprises a pin 34 operable to transmit torque from the motor 30 to the axle 26 and plate 24 of the damper 20. The pin 34 is provided at least partially within a coupling 36 to effect rotation of the pin 34 in clockwise and counterclockwise directions.

Figure 6:
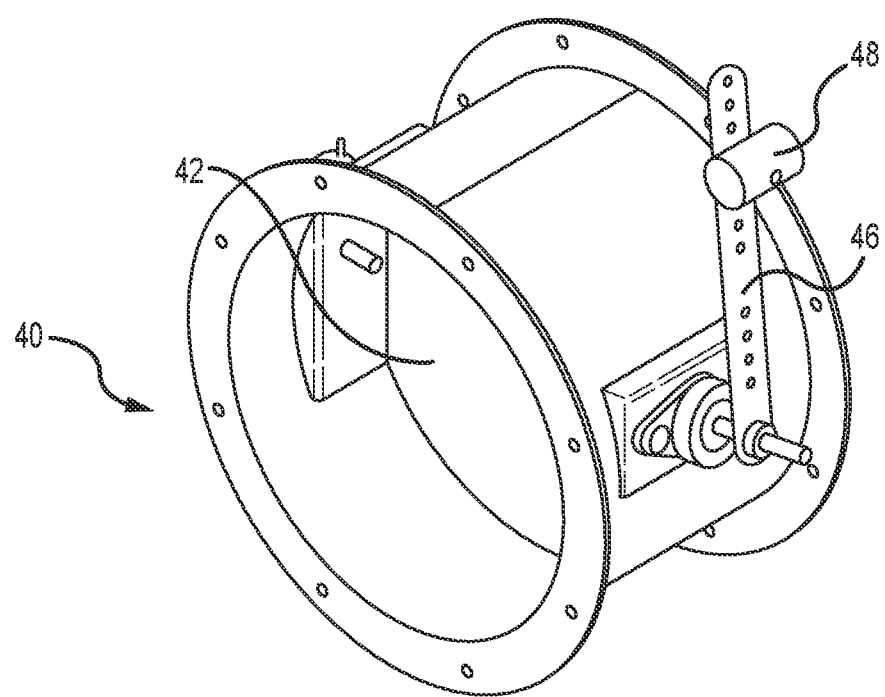
FIG. 6 is a perspective view of a damper according to one embodiment of the present disclosure.
Figure 8:
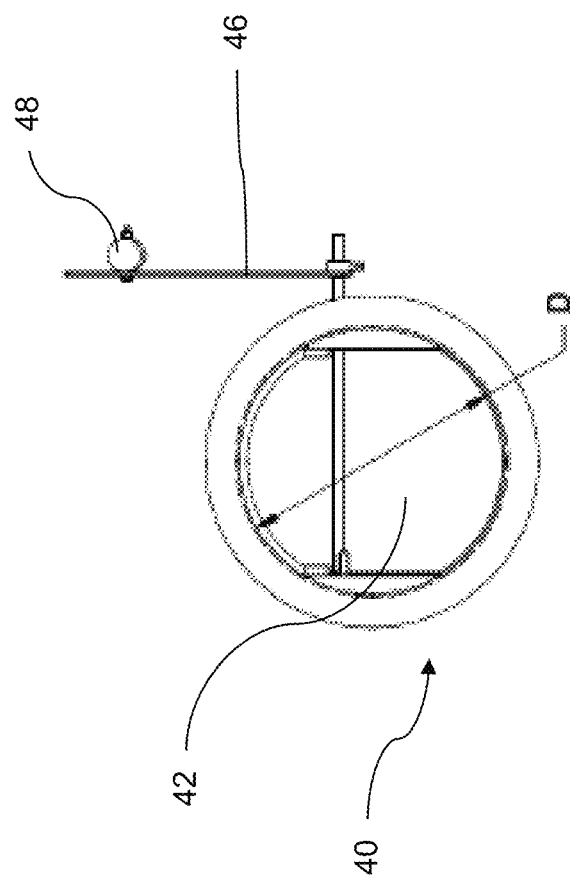
FIG. 8 is a front elevation view of the damper according to the embodiment of FIG. 6.
Figure 7:
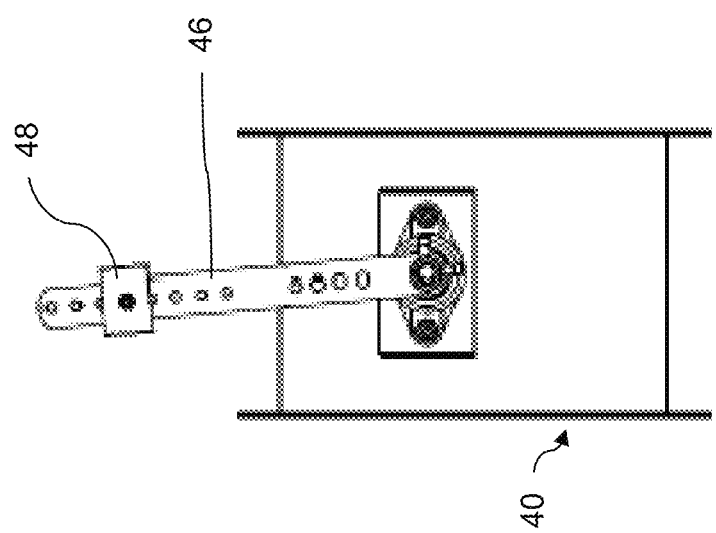
FIG. 7 is a side elevation view of the damper according to the embodiment of FIG. 6.

FIGS. 6-8 depict a weight damper device 40 contemplated for use with various embodiments of the present disclosure. As shown, the damper 40 comprises a plate 42 provided within an airflow path and operable to control or regulate airflow. The plate 42 is provided on an axle that further comprises an arm 46 with a counterweight 48. The counterweight 48 is adjustable in its position and may be provided at various increments based on system demands. Although one type of weighted damper is shown in FIGS. 6-8, other weighted damper devices are also contemplated for use with embodiments of the present disclosure. In various embodiments, airflow adjustments including adjustments to sources of supplemental air are provided and regulated by one or more weighted damper members. Weighted dampers are contemplated as being provided in addition to or in lieu of electronically controlled dampers. For example, in some embodiments, at least one weighted damper is provided in a tube of a supplemental air source. The tube is in fluid communication with a transport pipe of the system and is operable to selectively supply air to the transport pipe. When an airflow or pressure within the transport pipe falls below a predetermined level, a pressure differential is created between the transport pipe and the tube of the supplemental air source. A weighted damper, such as that shown in FIG. 6, is calibrated to be forced open when the force of the counterweight 48 is overcome. Air is then supplied to the transport pipe until the pressure differential is reduced or eliminated. In this example, the transport pipe is contemplated as comprising a section of transport pipe that is downstream of an expansion from a pipe of a first diameter to a pipe of a second, larger diameter.

Figure 9:
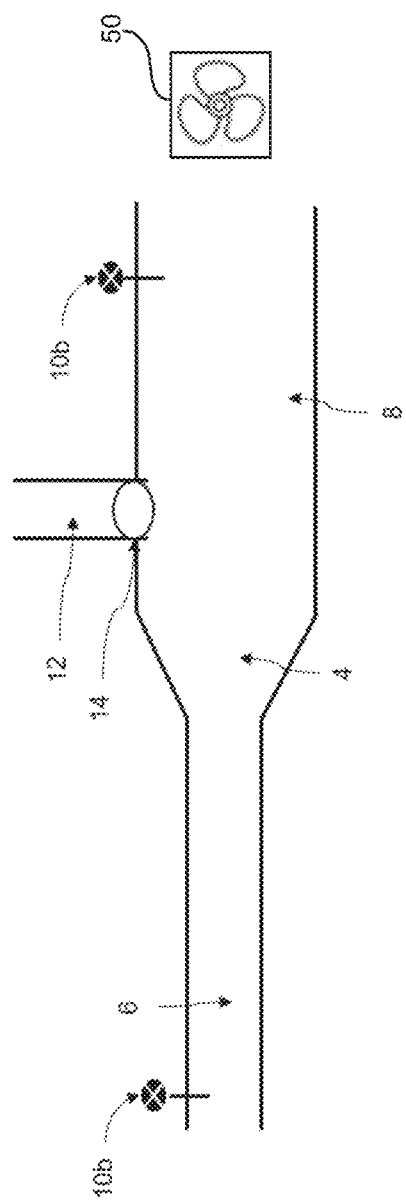
FIG. 9 is a cross-sectional elevation view of an embodiment of the present disclosure.

FIG. 9 is a simplified cross-sectional view of a system according to one embodiment of the present disclosure. The system of FIG. 9 is contemplated as comprising a system that conveys trash or linen. The system comprises at least one transition 4 wherein a first tube 6 having a first diameter (e.g. 16") is connected to and flows into a second tube 8 of a second diameter and wherein the second diameter is larger than the first (e.g. 20"). The system further comprises a plurality of airflow monitors 10a, 10b, and wherein a first airflow monitor 10a is provided upstream of the at least one transition 4 and a second airflow monitor 10b is provided downstream of the at least one transition. The monitors are in communication with a controller (not shown in FIG. 9) and the controller is in communication with a supplemental air source to electively increase or decrease airflow from the supplemental airflow source 12.

The system of FIG. 9 preferably comprises a primary air mover 50 (e.g. a fan or vacuum) in addition to the supplemental air source. A damper 14 is provided in a transport pipe to selectively open an allow supplemental air to be provided to a pipe (for example, to the second pipe 8 when the pressure in the second pipe 8 is too low). The damper 14 is contemplated as comprising various dampers including those shown and described herein. Although the damper 14 of FIG. 9 is shown as generally being provided at an intersection of a make-up air pipe and the second pipe 8, it will be recognized that the damper can be provided at various locations upstream of what is shown in FIG. 9. Additionally, multiple dampers and multiple make-up air conduits can be provided.

Weighted and electronically controlled dampers are contemplated by various embodiments of the present disclosure. It will be recognized, however, that weighted and controlled dampers are not mutually exclusive. Indeed, some embodiments of the present disclosure contemplate the provision of a plurality of dampers within a system and wherein at least one weighted damper and at least one controlled damper are provided. In some embodiments, one or more dampers are provided that comprise a weighted damper with an actuator. For example, it is contemplated that a damper is provided that is weighted or otherwise biased toward a closed position and wherein the damper can be opened or adjusted by a pressure differential and/or an electronic actuator (e.g. motor).

The examples set forth above are provided to give those of ordinary skill in the art a complete disclosure and description of how to make and use the embodiments of the methods for prediction of the selected modifications that may be made to a biomolecule of interest and are not intended to limit the scope of what the inventors regard as the scope of the disclosure. Modifications of the above-described modes for carrying out the disclosure can be used by persons of skill in the art and are intended to be within the scope of the following claims.

It is to be understood that the disclosure is not limited to particular methods or systems, which can, of course, vary. It is also to be understood that the terminology used herein is for the purpose of describing particular embodiments only and is not intended to be limiting.

A number of embodiments of the disclosure have been described. Nevertheless, it will be understood that various modifications may be made without departing from the spirit and scope of the present disclosure. Accordingly, other embodiments are within the scope of the following claims.

What is claimed is:

1. A pneumatic tube delivery system comprising:
a primary air mover for providing air to the system and conveying materials through the system;
a first pneumatic tube having a first diameter;
a second pneumatic tube having a second diameter, wherein the second diameter is greater than the first diameter;
wherein the first pneumatic tube comprises a first airflow sensor and the second pneumatic tube comprises a second airflow sensor, wherein the first airflow sensor and the second airflow sensor are in communication with a controller;
wherein the controller is in communication with and operable to control a valve to regulate airflow; and
wherein the valve comprises a damper with an actuator and the controller is in communication with the actuator.

2. The system of claim 1, wherein at least one of the first airflow sensor and the second airflow sensor comprises a pressure sensor.

3. The system of claim 1, wherein the first pneumatic tube and the second pneumatic tube are connected in series.

4. The system of claim 1, wherein the second pneumatic tube is provided downstream of the first pneumatic tube.

5. The system of claim 1, wherein the valve is provided in a supplemental air source provided in fluid communication with the second pneumatic tube.

6. A method of operating a pneumatic tube delivery system, the method comprising:
providing a first pneumatic tube having a first diameter;
providing a second pneumatic tube having a second diameter, wherein the second diameter is greater than the first diameter;
providing a first airflow sensor in communication with the first pneumatic tube and a second airflow sensor in communication with the second pneumatic tube, wherein the first airflow sensor and the second airflow sensor are in communication with a controller;
wherein the controller is in communication with and operable to control a valve to regulate airflow;
comparing a value from the first airflow sensor with a value from the second airflow sensor; and
based on the comparing step, selectively increasing or decreasing airflow to the second pneumatic tube.

7. The method of claim 6, wherein the system comprises a primary air mover and a secondary air source.

8. The method of claim 7, wherein the secondary air source is in fluid communication with the second pneumatic tube.

9. The method of claim 6, wherein the valve comprises a damper in communication with the second pneumatic tube.

10. The method of claim 9, wherein the damper comprises a motor operable to receive signals from the controller.

11. The method of claim 6, wherein second pneumatic tube is provided in series with and downstream of the first pneumatic tube.

12. A transport system comprising:
a primary air mover for providing air to the system and conveying materials through the system;
a first transport pipe having a first diameter;
a second transport pipe having a second diameter, wherein the second diameter is greater than the first diameter;
wherein the first transport pipe and the second transport pipe are connected in series and the second transport pipe is downstream of the first transport pipe; and
a third pipe provided in communication with the second transport pipe, wherein the third pipe comprises a source of supplemental air;
at least one of a valve and a damper provided in communication with at least one of the second transport pipe and the third pipe, wherein the at least one of a valve and a damper is operable to control airflow to the second transport pipe,
wherein the at least one of a valve and damper comprises a weighted damper that is operable to be forced open in response to a predetermined pressure difference.

13. The transport system of claim 12, wherein the at least one of a valve and damper is provided within the third pipe.

14. The transport system of claim 12, wherein the at least one of a valve and damper comprises a damper with a motor and an actuator.

15. The transport system of claim 14, wherein the actuator is in electronic communication with an airflow sensor provided in the system.

16. The transport system of claim 14, wherein a first airflow sensor is provided in the first transport pipe and a second airflow sensor is provided in the second transport pipe.

17. The transport system of claim 12, wherein the system comprises at least one of a trash and linen transport system.

18. The transport system of claim 12, further comprising an air velocity sensor in the second transport pipe.

* * * * *